(12) United States Patent
Do

(10) Patent No.: US 10,156,099 B2
(45) Date of Patent: Dec. 18, 2018

(54) DOWNHOLE TOOLS INCLUDING FASTENING ASSEMBLIES, AND RELATED METHODS

(71) Applicant: Baker Hughes Incorporated, Houston, TX (US)

(72) Inventor: Do Van Do, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 440 days.

(21) Appl. No.: 14/994,793

(22) Filed: Jan. 13, 2016

(65) Prior Publication Data

US 2017/0198742 A1 Jul. 13, 2017

(51) Int. Cl.
*E21B 10/62* (2006.01)
*F16B 39/24* (2006.01)
*E21B 10/00* (2006.01)
*E21B 10/20* (2006.01)
*F16B 39/06* (2006.01)

(52) U.S. Cl.
CPC .............. *E21B 10/62* (2013.01); *E21B 10/00* (2013.01); *E21B 10/20* (2013.01); *F16B 39/06* (2013.01)

(58) Field of Classification Search
CPC ........... E21B 10/00; E21B 10/62; F16B 39/24
USPC ................... 411/119, 121, 128, 142
See application file for complete search history.

(56) References Cited

U.S. PATENT DOCUMENTS

| | | | | |
|---|---|---|---|---|
| 757,526 | A | * | 4/1904 | Varley ................ F16B 39/10 411/120 |
| 4,735,533 | A | * | 4/1988 | Gallagher ............. F16K 35/00 411/119 |
| 7,300,237 | B2 | | 11/2007 | Illedits et al. |
| 8,689,877 | B2 | | 4/2014 | Telfer et al. |
| 8,978,777 | B2 | | 3/2015 | Nguyen |
| 2011/0085877 | A1 | | 4/2011 | Osborne, Jr. |
| 2012/0205160 | A1 | * | 8/2012 | Ricks ................. E21B 10/14 175/331 |

* cited by examiner

*Primary Examiner* — D. Andrews
*Assistant Examiner* — Yanick A Akaragwe
(74) *Attorney, Agent, or Firm* — TraskBritt

(57) ABSTRACT

A downhole tool includes a fastening assembly securing one component to another component. The fastening assembly may include a threaded fastener located in an aperture of one component and a locking mechanism located in a cavity proximate the aperture. The threaded fastener may include a flange including mutually spaced holes located circumferentially within an outer periphery of the flange. The locking mechanism may include a spring and a dowel member. The locking mechanism may be positioned within a hole of the flange and may be configured to retain the threaded fastener in a fixed position relative to one component. Methods include using a depressor ring including teeth corresponding to the holes of the flange to depress the locking mechanism into the cavity while tightening the threaded fastener.

20 Claims, 7 Drawing Sheets

DOWNHOLE TOOLS INCLUDING FASTENING ASSEMBLIES, AND RELATED METHODS

TECHNICAL FIELD

Embodiments of the present disclosure relate to downhole tools including components and, more particularly, to fastening assemblies attaching the components to the downhole tools, and related methods.

BACKGROUND

Earth-boring tools are used to form boreholes (e.g., wellbores) in subterranean formations. Such earth-boring tools include, for example, drill bits, reamers, mills, etc. For example, roller cone bits (also termed "rock" bits) as well as fixed-cutter earth-boring rotary drill bits (often referred to as a "drag" bits) have relatively long service lives, with relatively infrequent failure. In particular, considerable sums are expended to design and manufacture roller cone rock bits and fixed-cutter bits in a manner that minimizes the opportunity for catastrophic drill bit failure during drilling operations. The loss of a roller cone or a polycrystalline diamond compact (PDC) from a fixed-cutter bit during drilling operations can impede the drilling operations and, at worst, necessitate rather expensive fishing operations to retrieve the lost component. If the fishing operations fail, sidetrack-drilling operations must be performed in order to drill around the portion of the wellbore that includes the lost roller cones or PDC cutters.

Typically, during drilling operations, bits are pulled and replaced with new bits even though significant service could be obtained from the replaced bit. These premature replacements of downhole drill bits are expensive, since each trip out of the well prolongs the overall drilling activity by wasting valuable rig time and consumes considerable manpower, but are nevertheless done in order to avoid the far more disruptive and expensive process of, at best, pulling the drill string and replacing the bit or fishing and sidetrack drilling operations necessary if one or more cones or compacts are lost due to bit failure.

In addition to drilling operations, the loss of components secured to tool bodies could also prove to be disruptive and expensive for a variety of downhole operations, including, for example, reaming, logging, testing, coring, and production. In particular, many components are secured to downhole tools by removable fasteners that may become loose (i.e., back off) due to vibration, which may give rise to tool failure during downhole operations.

BRIEF SUMMARY

In one embodiment of the disclosure, a downhole tool, comprises an assembly comprising at least two components. The downhole tool includes at least one fastening assembly securing one of the at least two components to another of the at least two components. The at least one fastening assembly comprises a threaded fastener having a longitudinal portion within an aperture in the one of the at least two components and a threaded segment of the longitudinal portion engaged with a cooperatively threaded bore extending at least into the other component. The threaded fastener may include a flange extending laterally from the longitudinal portion substantially abutting an adjacent surface of the one component. The flange may comprise a plurality of mutually spaced holes located circumferentially within an outer periphery of the flange and extending parallel to the longitudinal portion. Furthermore, the at least one fastening assembly may comprise at least one locking mechanism including a spring located in a cavity of the one of the at least two components proximate the aperture and a dowel member biased outwardly with a portion extending into one of the holes of the flange and a second portion within the cavity.

In another embodiment of the disclosure, a fastening system for a downhole tool comprises at least one component configured to attach to a body of the downhole tool. The at least one component comprises at least one cavity and at least one aperture. At least one spring-loaded locking mechanism may be located in the at least one cavity. A threaded fastener may be located in the at least one aperture, the threaded fastener comprises a head portion, a threaded portion and a flange including a plurality of holes positioned in vertical alignment with the at least one cavity. The at least one component may also comprise a removable depressor ring including a plurality of teeth positioned to insert into the plurality of holes of the flange. The removable depressor ring may be configured to depress the at least one spring-loaded locking mechanism during tightening of the threaded fastener. A portion of the at least one spring-loaded locking mechanism may be configured to slide into a hole of the plurality of holes once the removable depressor ring has been removed and the flange of the threaded fastener is in locked position against an adjacent surface of the at least one component.

In yet another embodiment of the disclosure, a method of fastening a component of a downhole tool body may comprise inserting at least one locking mechanism into a cavity of the component against an outward biasing force. A threaded fastener including a flange comprising a plurality of holes may be provided. A depressor ring may be installed onto the threaded fastener. The depressor ring may include a plurality of teeth corresponding to and received within the plurality of holes of the flange. The threaded fastener may be inserted into an aperture of the component adjacent the cavity and may be tightened with a tool abutting the depressor ring to cause the flange and teeth to depress the at least one locking mechanism into the cavity. The depressor ring may be removed to permit a portion of the at least one locking mechanism to enter a hole of the flange under the biasing force.

BRIEF DESCRIPTION OF THE DRAWINGS

While the specification concludes with claims particularly pointing out and distinctly claiming what are regarded as embodiments of the disclosure, various features and advantages of disclosed embodiments may be more readily ascertained from the following description when read with reference to the accompanying drawings, in which:

DETAILED DESCRIPTION

The illustrations presented herein are not actual views of any particular fastener, component, downhole tool, or method act, but are merely idealized representations employed to describe embodiments of the present disclosure. Additionally, elements common between figures may retain the same numerical designation.

The following description provides specific details, such as types and placement of materials, in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. Additional acts or materials for attaching components to downhole tools using fastening assemblies may be performed by conventional techniques.

As used herein, the term "earth-boring tool" means and includes any tool used to remove formation material and form a bore (e.g., a wellbore) through the formation by way of removing the formation material. Earth-boring tools include, for example, rotary drill bits (e.g., fixed-cutter or "drag" bits and roller cone or "rock" bits), hybrid bits including both fixed-cutters and roller elements, coring bits, percussion bits, bi-center bits, reamers (including expandable reamers and fixed-wing reamers), and other so-called "hole-opening" tools, etc.

As used herein, the term "drill bit" includes and encompasses any downhole tool for drilling or enlarging a borehole and which includes at least one rotational/roller element. Non-limiting examples of such downhole tools are roller cone drill bits, "hybrid" drill bits, which have both cones and fixed-cutters, as well as reaming tools using roller cones or other rotational elements.

As used herein, the term "downhole tool" means and includes any tool used in earth-boring operations, including, for example, rotary drill bits, roller cone bits, hybrid bits, coring bits, percussion bits, bi-center bits, reamers, etc. In addition, the term "downhole tool" also means and includes tools for a variety of downhole operations, including, for example, testing, logging, coring, steering, seismic, completion, service, etc. In the broadest sense of the term, as used herein, "downhole tool" means and includes any downhole assembly including at least two components mutually secured by a fastener.

Figure 1:
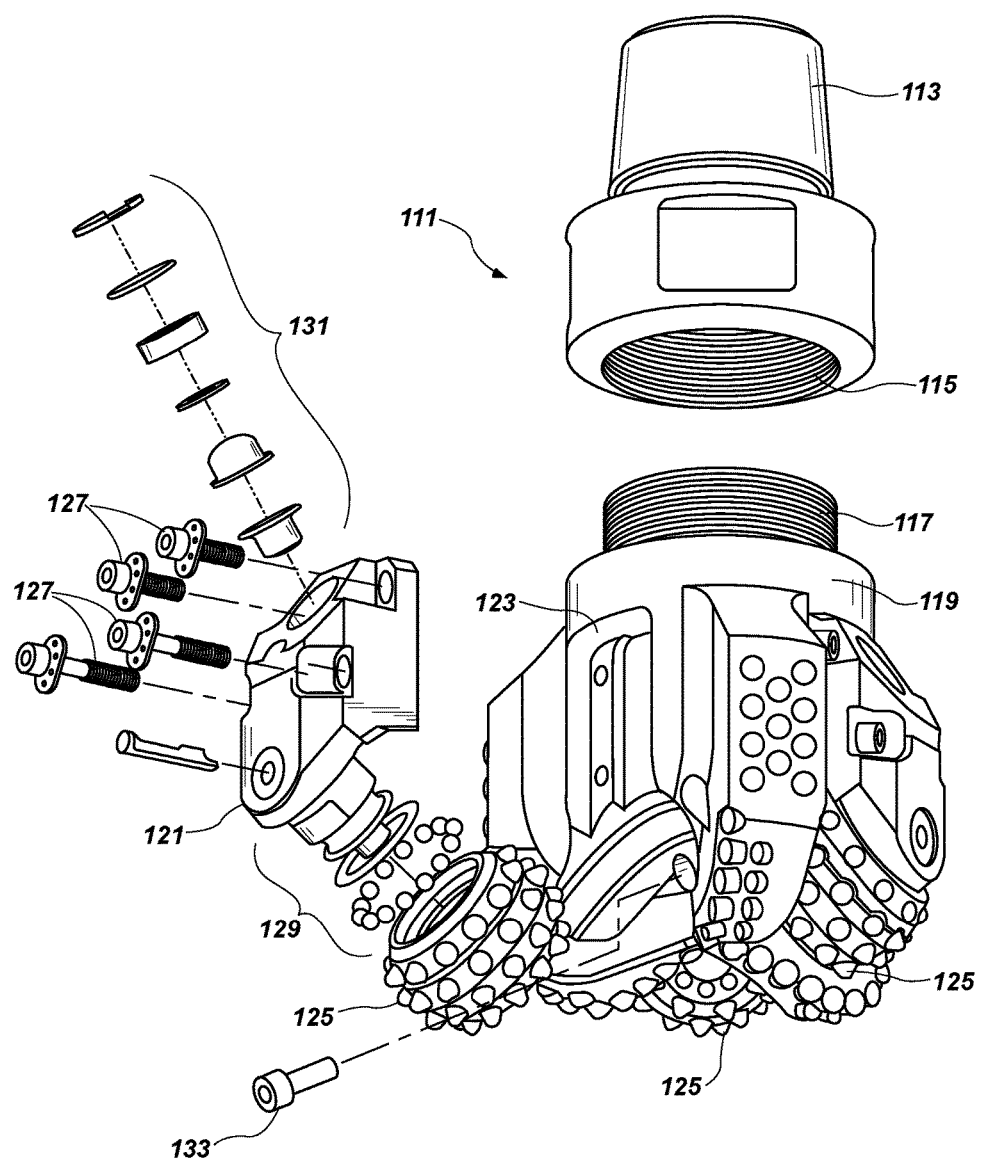
FIG. 1 is a perspective view of an earth-boring drill bit with formation-engaging structures, according to an embodiment of the present disclosure.

With reference to FIG. 1, an earth-boring tool (also referred to herein as a "downhole tool") is illustrated. The downhole tool 111 may be an earth-boring drill bit, and more specifically, a three-cone, three-blade rotary hybrid drill bit, as illustrated, although other types of downhole tools are within the scope of the present disclosure. FIG. 1 is an exploded view of the various parts of the downhole tool 111 disassembled. The modular construction principles of the present disclosure are equally applicable to roller cone and drag bits, as well as other bits with any combination of fixed blades and rolling cutters, as well as various downhole tool including components secured to a tool body.

As illustrated, the downhole tool 111 comprises a shank 113, which may be threaded or otherwise configured at its upper extent to connect to a drill string (not shown). At the lower extent of the shank 113, a generally cylindrical receptacle 115 may be formed. The cylindrical receptacle 115 may receive a correspondingly shaped and dimensioned threaded connection 117 at the upper extent of a bit body 119. The shank 113 and bit body 119 may be joined together by inserting the threaded connection 117 at the upper extent of bit body 119 into the cylindrical receptacle 115 in the lower extent of the shank 113.

A leg 121 (three are shown) may be received in an axially extending slot 123 (again, there is a slot 123 for each leg 121). The axially extending slot 123 may be dovetailed (and the leg 121 correspondingly shaped) so that only axial sliding of the leg 121 is permitted and the leg 121 resists radial removal from the axially extending slot 123. In the present embodiment, a plurality (four) of threaded fasteners 127 may secure each leg 121 in the axially extending slot 123 so that the leg 121 may be secured against axial motion in and removal from the axially extending slot 123. However, additional embodiments of affixing legs or other components to bit bodies or other downhole tools are also envisioned. In the embodiment shown in FIG. 1, a rolling cone 125 bearing inserts or integral teeth may be secured on a bearing associated with each leg 121 by a ball lock and seal assembly 129. In the present embodiment, apertures in the leg 121 through which the threaded fasteners 127 extend may be oblong and oversized, to permit axial or radial positioning of the leg 121 within the axially extending slot 123, which, in turn, permits selection of the relative projection of the cutting elements on each rolling cone 125. A lubricant compensator assembly 131 may also be carried in each leg 121 of the present embodiment to supply lubricant to a bearing assembly and to compensate for pressure variations in the lubricant during drilling operations.

In the illustrated embodiment, at least one nozzle insert 133 may be received and retained in the bit body 119 to direct a stream of drilling fluid from the interior of downhole tool 111 to selected locations proximate the cones 125 and blades of the bit body 119. In the present embodiment, the axially extending slot 123 may have a pair of adjacent opposing sides to receive each of the threaded fasteners 127.

Figure 2:
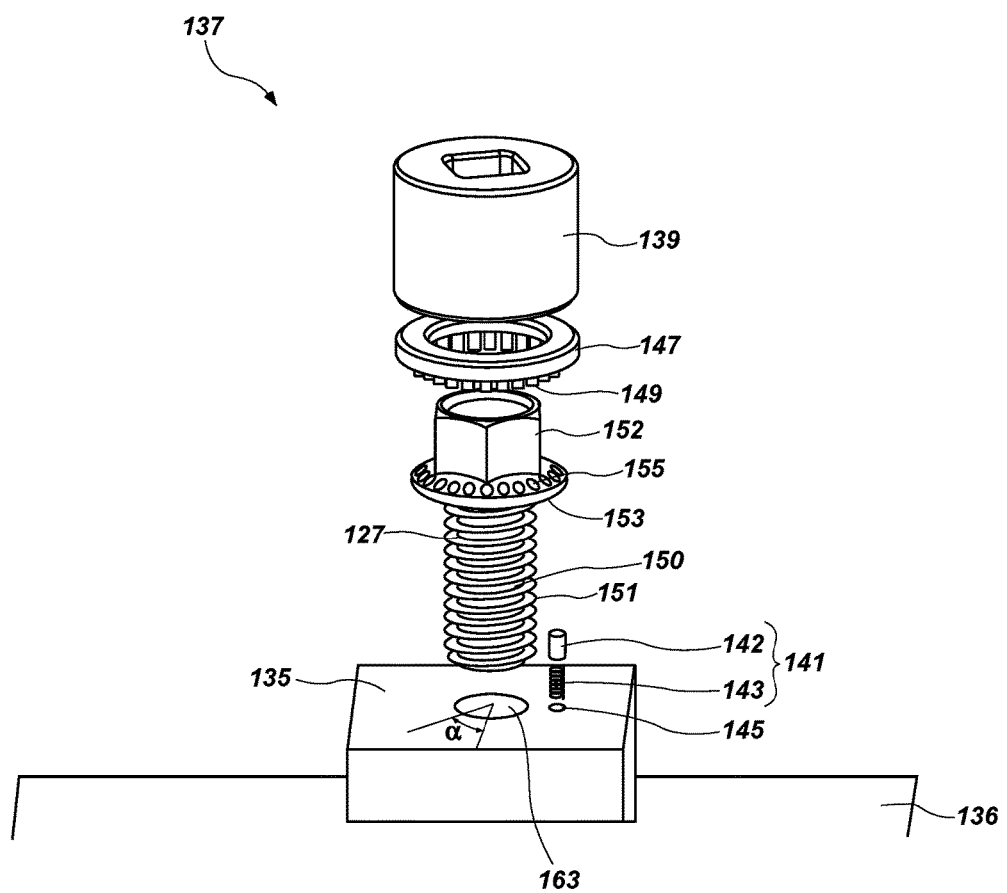
FIG. 2 is an exploded perspective view of a fastening assembly, according to an embodiment of the present disclosure.

FIG. 2 illustrates an exploded perspective view of a disassembled fastening assembly 137 including a single threaded fastener 127 shown in FIG. 1. The threaded fastener 127 may comprise a threaded bolt, such as a socket flange bolt, or may comprise, by way of non-limiting example, a screw, nut, or any other conventional, elongated fastener. The threaded fastener 127 has a longitudinal portion 150 including a threaded portion 151, as well as a head portion 152 at an end opposite from the threaded portion 151. By way of example and not limitation, the head portion 152 may include a standard size and shape (e.g., oval, round, hex, slotted hex, socket cap, etc.) such that the threaded fastener 127 may be tightened with a tool 139. While the embodiment as illustrated includes a hex bolt and standard socket for use with a socket wrench, alternative tools are also contemplated, such as, for example, wrenches, ratchets, screwdrivers, pliers, etc. The threaded fastener 127 may also comprise a flange 153 extending laterally from the longitudinal portion 150 of the threaded fastener 127 and located between the threaded portion 151 and the head portion 152. In some embodiments, the flange 153 may be permanently affixed to the threaded fastener 127, while in other embodiments the flange 153 may be configured as a separate component with an inner bore sized and shaped to cooperatively engage an exterior of the head portion 152 with an interference fit. The flange 153 of the threaded fastener 127 may comprise a plurality of holes 155. By way of example and not limitation, the plurality of holes 155 may be mutually spaced and may be located circumferentially within an outer periphery of the flange 153. In some embodiments, the plurality of holes 155 may be parallel to the longitudinal portion 150 of the threaded fastener 127.

The fastening assembly 137 may also comprise a depressor ring 147, which may be removably positioned around the head portion 152 of the threaded fastener 127. In some embodiments, the depressor ring 147 may comprise a plurality of teeth 149 configured and positioned to align with the plurality of holes 155 of the flange 153. In the illustrated embodiment, the teeth 149 of the depressor ring 147 may be inserted into the holes 155 of the flange 153 until the bottom surface of the flange 153 and the teeth 149 of the depressor ring 147 are flush (i.e., even with one another). In addition, the fastening assembly 137 may comprise at least one dowel member 142 and at least one spring 143, collectively referred to herein as "at least one locking mechanism 141." By way of example and not limitation, the at least one dowel member 142 may include a dowel (e.g., dowel pin, screw dowel, spring dowel, etc.), pin, peg, or any suitable cylindrical rod. As illustrated in the present embodiment, the plurality of holes 155 of the flange 153 and the at least one dowel member 142 are cylindrical in shape, a diameter of the at least one dowel member 142 being marginally smaller than an inner diameter of the plurality of holes 155. However, other shapes are contemplated, such as, for example, oval, oblong, as well as planar tabs fitted to square, rectangular or elongated slots. In some embodiments, the at least one locking mechanism 141 may be biased, or even spring-biased. In addition, the at least one spring 143 may include, for example, a compression spring (e.g., coil, Belleville, etc.), or alternatively, the at least one spring 143 may comprise any suitable type of elastomeric member. Furthermore, in some embodiments, the at least one spring 143 may be separate from the at least one dowel member 142 and may comprise a same material or a different material than the at least one dowel member 142. In other embodiments, the at least one spring 143 may be internal, integral, or otherwise included within, or permanently attached to, the at least one dowel member 142.

In some embodiments, the fastening assembly 137 may be utilized to attach a component 135 to a receiving surface 136, such as, for example, to attach the leg 121 to the axially extending slot 123 of the downhole tool 111 of FIG. 1. To facilitate attachment of the component 135 to the receiving surface 136, the component 135 may comprise an aperture 163 positioned and sized to receive the threaded fastener 127. In some embodiments, the aperture 163 of the component 135 may comprise complementary threads to the threaded portion 151 of the threaded fastener 127. In other embodiments the aperture 163 of the component 135 may not comprise threads, but rather may include a generally smooth, non-threaded cylindrical surface. By way of non-limiting example, the aperture 163 of the component 135 may comprise a through bore with smooth sides and the cross-sectional diameter of the aperture 163 of the component 135 may be greater than the diameter of the longitudinal portion 150 of the threaded fastener 127. In some embodiments, at least a portion of the threaded portion 151 of the longitudinal portion 150 may pass through the component 135, for example, to be engaged with a cooperatively threaded bore extending into a portion of the receiving surface 136.

In some embodiments, the receiving surface 136 may comprise a borehole containing, for example, complementary threads for receiving the threaded portion 151 of the threaded fastener 127. By way of example and not limitation, a borehole may be a through bore or a blind bore. However, other configurations of apertures, cavities, or boreholes of the receiving surface 136 are also contemplated. In some embodiments, the component 135 may include a counterbore (i.e., a borehole having a flat-bottomed enlargement at its mouth) configured to recess an outer end of the head portion 152 of the threaded fastener 127 below the exposed outer surface of the component 135.

With continued reference to FIG. 2, the locking mechanism 141 (including, for example, the dowel member 142 and the spring 143) may be positioned within a cavity 145 of the component 135. The cavity 145 may be adjacent to the aperture 163 of the component 135 and at a radius from the center of the aperture 163 corresponding to a radius of the holes 155 from a center of the threaded fastener 127. In addition, the cavity 145, and, in turn, the locking mechanism 141 may be in direct vertical alignment with the holes 155 of the flange 153. In other words, the locking mechanism may be oriented generally parallel with respect to the threaded fastener 127. In some embodiments, the flange 153 may extend laterally from the longitudinal portion 150 of the threaded fastener 127. Furthermore, the flange 153 may substantially abut an adjacent surface of the component 135 when the threaded fastener 127 is secured in place. When the threaded fastener 127 is secured in place as by threaded engagement with the bore in the receiving surface 136, the dowel member 142 may be biased outwardly with a portion extending into one of the holes 155 of the flange 153 and a second portion within the cavity 145.

In addition, it is contemplated in any of the illustrated embodiments that the at least one locking mechanism 141 may comprise a plurality of locking mechanisms 141, including a plurality of dowel members 142 and a plurality of springs 143. For example, the component 135 may comprise a plurality of cavities 145 circumferentially spaced at equal radii about a center of aperture 163, with the plurality of locking mechanisms 141 inserted in at least some of the cavities 145 in order to strengthen the locking capability of the fastening assembly 137 when the threaded fastener 127 is secured in place.

Furthermore, it is contemplated that the holes 155 of the flange 153 may be strategically offset in order to improve angular resolution (i.e., rotational position) to facilitate alignment of the locking mechanism 141 with a hole of the plurality of holes 155 of the flange 153. In some embodiments, an angle α between the holes 155 in the perimeter of the flange 153 may be less than the angle α between at least two locking mechanisms of the plurality of locking mechanisms 141. By way of non-limiting example, the angle α between the holes 155 in the perimeter of the flange 153 may be 5 degrees, while the angle α between two locking mechanisms of the plurality of locking mechanisms 141 may be 7.5 degrees. In this particular embodiment, the threaded fastener 127 need only turn 2.5 degrees to enable a hole of the plurality of holes 155 of the flange 153 to be aligned with a locking mechanism of the plurality of locking mechanisms 141. In other embodiments, the angle α between the plurality of holes 155 in the perimeter of the flange 153 may be greater than the angle α between at least two of the plurality of locking mechanisms 141 if hole spacing is an issue to retain sufficient structural strength in the flange 153. It is to be appreciated that any variety of configurations of angular resolution may be employed to facilitate alignment of the holes 155 of the flange 153 with the locking mechanism 141 as the threaded fastener 127 is tightened into locked position.

In addition, the size, shape, and depth of the cavity 145 may be selected to contain at least a portion of the locking mechanism 141. Furthermore, the cavity 145 may include features configured to retain one, or both, the dowel member 142 and the spring 143 until they are secured into locked position. By way of example and not limitation, the cavity 145 may provide an interference fit (i.e., friction fit or press fit) such that a portion of the locking mechanism 141 may temporarily be retained within the cavity 145. In some embodiments, the dowel member 142 may include fins or dowel connectors. In other embodiments, the dowel member 142 may be a spring dowel, which expands laterally. It is also contemplated that various other types of features may be provided in order to temporarily hold the dowel member 142 within the cavity 145 during tightening of the threaded fastener 127.

Furthermore, it is contemplated in the present disclosure that the fastening assembly 137 may be configured to be removable and reusable. In some embodiments, the depressor ring 147 may be reinserted over the head portion 152 of the threaded fastener 127 in order to depress the locking mechanism 141 into the cavity 145 of the component 135 during removal of the threaded fastener 127. In this manner, the component 135 may be removed, exchanged, or secured again to the receiving surface 136 without damage to any one of the components collectively designated as the fastening assembly 137.

Finally, while the previous embodiments disclose the aperture 163 of the threaded fastener 127 as well as the cavity 145 of the locking mechanism 141 being located in the component 135, other embodiments are contemplated. In other embodiments (not shown), the threaded fastener 127 may include a threaded nut comprising, for example, the flange 153, the plurality of holes 155, and the locking mechanism 141, while the bolt may be a standard bolt. It is to be appreciated that various downhole assemblies including at least two components (e.g., bit body, blade, nozzle, etc.) may be mutually secured by a fastening assembly 137 in any configuration or combination of configurations.

Figure 3A:
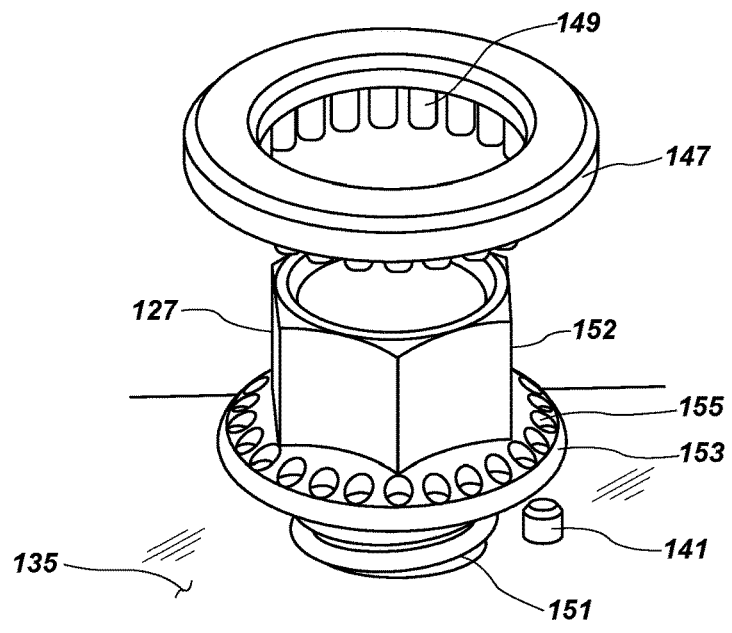
FIG. 3A is an exploded perspective view of the fastening assembly of FIG. 2, according to an embodiment of the present disclosure.
Figure 3B:
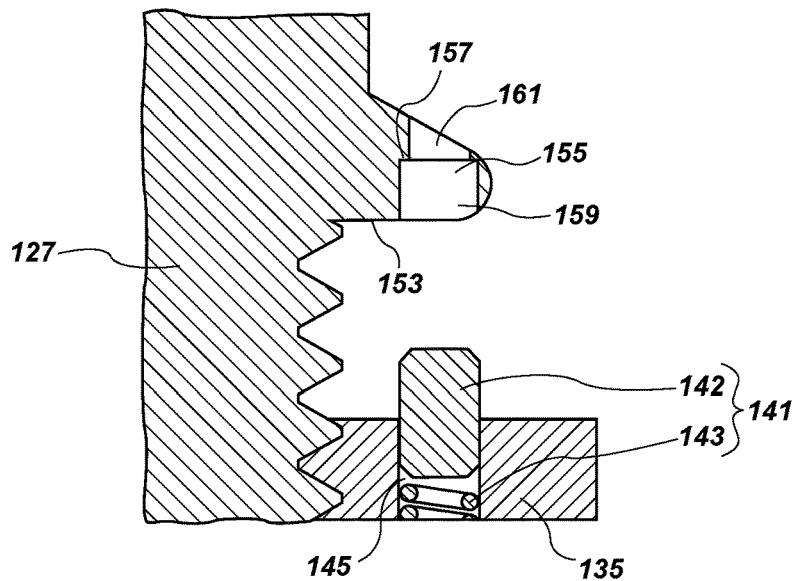
FIG. 3B is an exploded side, cross-sectional view of the fastening assembly of FIG. 2, according to an embodiment of the present disclosure.
Figure 3C:
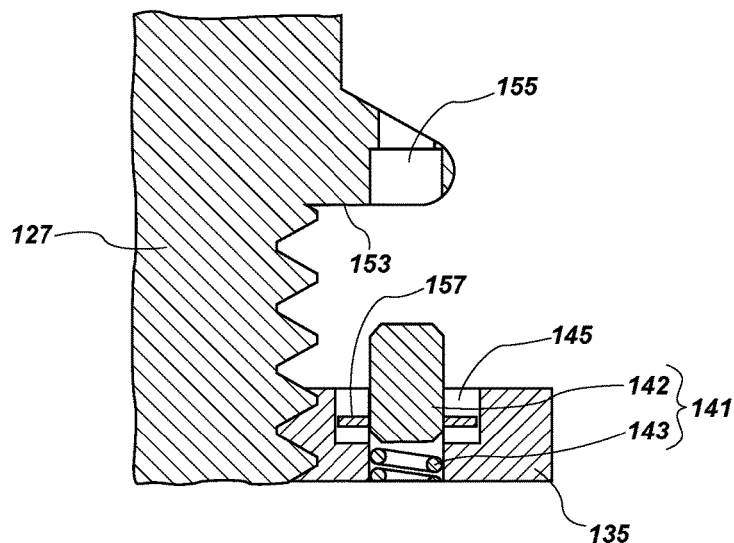
FIG. 3C is an exploded side, cross-sectional view of the fastening assembly of FIG. 2, according to an embodiment of the present disclosure.

FIGS. 3A through 3C are exploded views of the fastening assembly 137 of FIG. 2 illustrating the threaded fastener 127 partially inserted into the component 135. As shown in the embodiment of FIG. 3A, a portion of the locking mechanism 141 may be inserted into the cavity 145 (not visible) of the component 135. Similarly, a portion of the threaded portion 151 of the threaded fastener 127 may be inserted into the aperture 163 (not visible) of the component 135. As illustrated in the present embodiment, the depressor ring 147 may be positioned over the head portion 152 of the threaded fastener 127, and in particular, the teeth 149 of the depressor ring 147 may be positioned in vertical alignment with the holes 155 of the flange 153.

In one embodiment, as shown in FIG. 3B, the holes 155 of the flange 153 may comprise a lower aperture 159 and an upper aperture 161. As a non-limiting example, the cross-sectional diameter of the lower aperture 159 may be larger than the cross-sectional diameter of the upper aperture 161. Thus, a stopping mechanism 157 may be provided in order to retain the dowel member 142 of the locking mechanism 141 within the cavity 145 of the component 135 when the threaded fastener 127 is in locked position. By way of example and not limitation, the stopping mechanism 157 may comprise a lip or a ridge, while other barriers are also contemplated. In some embodiments, the cross-sectional diameter of the dowel member 142 may be less than that of the lower aperture 159, and greater than that of the upper aperture 161. This particular embodiment allows the dowel member 142 to be biased into the lower aperture 159 but not into the upper aperture 161 of the holes 155, thus preventing escape of the locking mechanism 141. In some embodiments, the teeth 149 of the depressor ring 147 are sized and configured to be inserted through the upper aperture 161 as well as the lower aperture 159 of the holes 155. When inserted within the holes 155 of the flange 153, the bottom surface of the teeth 149 of the depressor ring 147 may be flush with the lower surface of the flange 153 in order to shield the locking mechanism 141 from prematurely entering the holes 155 of the flange 153 while the threaded fastener 127 is being tightened. Once the depressor ring 147 has been removed, a portion of the dowel member 142 of the locking mechanism 141 may be positioned in the cavity 145 while another portion of the dowel member 142 may be in locked position in a hole of the plurality of holes 155 of the flange 153. In the present embodiment of FIG. 3B, the spring 143 may be configured for size and strength in order to bias the dowel member 142 into locked position against the stop feature 157 of the holes 155.

In another embodiment, as shown in FIG. 3C, the cross-sectional diameter of the aperture of the holes 155 of the flange 153 may be continuous. In the present embodiment, the stop feature 157 may not be located in the holes 155 of the flange 153. Rather, the stop feature 157 may be located in the cavity 145 of the component 135. As illustrated in FIG. 3C, the stop feature 157 may comprise a flange, ring, or lip, for example, secured on the periphery of the dowel member 142. For example, the stop feature 157 may comprise a ring, tab, or other abutment feature associated with any portion of the dowel member 142 and residing within a counterbore at the mouth of cavity 145. In some embodiments, the stop feature 157 may be located along a longitudinal side of the dowel member 142. In other embodiments, the stop feature 157 may be associated with, or attached to, the spring 143. In yet other embodiments, the stop feature 157 may be associated with, or contained within, the cavity 145 of the component 135, or in the alternative, with the component 135 itself. It is to be appreciated that various configurations may be employed to facilitate retention of a portion of the dowel members 142 within the holes 155 of the flange 153 after the threaded fastener 127 has been tightened to a final position.

Figure 4:
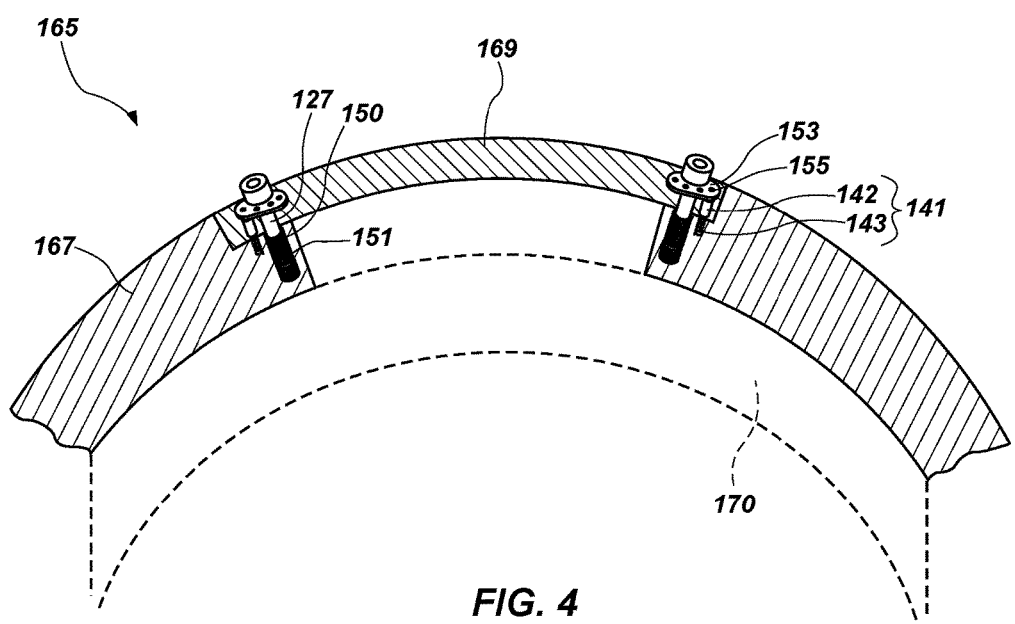
FIG. 4 is a side, cross-sectional view of a portion of a hatch assembly according to an embodiment of the present disclosure.

FIG. 4 is a side, cross-sectional view of a portion of a hatch assembly 165 of the present disclosure. As shown in FIG. 4, the threaded fastener 127 may also be used to secure a cover 169 (i.e., component) to a tubular body 167 (i.e., receiving body). In the illustrated embodiment, the threaded portion 151 of the threaded fastener 127 may be secured within the tubular body 167. The hatch assembly 165 may also encompass one or more internal components 170. By way of non-limiting example, the internal components 170 may comprise one or more of an electronics module, a sensor, or any other instrumentation or internal component associated with downhole operations. As discussed above with reference to FIG. 2, the threaded fastener 127 of FIG. 4 may also include a flange 153 comprising a plurality of holes 155. As before, the threaded fastener 127 may be secured into locked position by the locking mechanism 141, which, in turn, may be located within a cavity 145 (not visible) and inserted within the holes 155 of the flange 153. Furthermore, the dowel member 142 may be biased against a stop feature 157 by pressure from the spring 143 as depicted in FIGS. 3B and 3C.

Returning again to FIG. 4, a portion of the longitudinal portion 150 of the threaded fastener 127 may be inserted through the cover 169 and into the tubular body 167. In some embodiments, the threaded portion 151 of the threaded fastener 127 may end in a blind bore in the tubular body 167. In other embodiments, the threaded portion 151 of the threaded fastener 127 may extend into, or in the alternative, out from a through bore. In yet other embodiments, the threaded portion 151 may include a nut (e.g., locking nut, etc.). In other embodiments (not shown), the threaded fastener 127 may include a threaded nut comprising, for example, the flange 153, the holes 155, and the locking mechanism 141, while the bolt may be a standard bolt.

In addition, while FIG. 4 depicts the threaded fastener 127 extending through the cover 169 directed toward the radial center of the tubular body 167, alternative embodiments, for example, may include the threaded fastener 127 extending outwardly from the tubular body 167 into or through the cover 169 (e.g., ending in a blind bore, through bore, etc.) at the outer perimeter of the hatch assembly 165. In yet other embodiments, the threaded fastener 127 may extend laterally or longitudinally with respect to the tubular body 167. In addition, a variety of embodiments are contemplated to secure the internal component 170 to the tubular body 167 or to various other internal components 170. It is to be appreciated that the size and orientation of the attachment features may be varied based on a number of factors that may affect the securing and removal of the cover 169 to the tubular body 167, including, for example, the design of each of the components. Furthermore, the material of the tubular body 167 is depicted as a metal in the illustrated embodiment, but it is also contemplated that any casing, container, or body may also be constructed of various other materials (e.g., metal alloy, plastic, ceramic, etc.).

Figure 5:
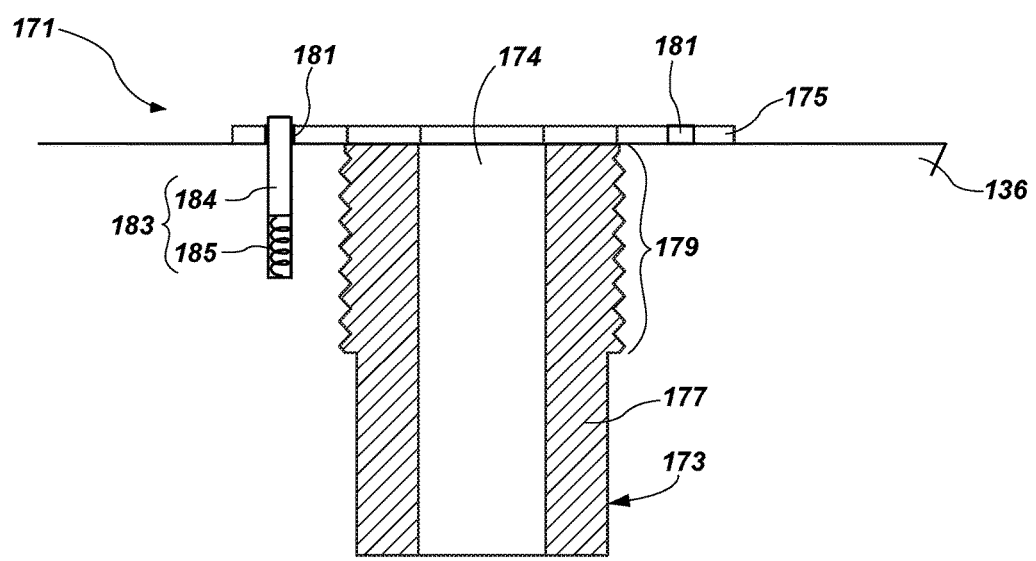
FIG. 5 is a side, cross-sectional view of a nozzle assembly according to an embodiment of the present disclosure.

FIG. 5 is a side, cross-sectional view of a nozzle assembly 171 of the present disclosure. The nozzle assembly 171 may be similar to the nozzle insert 133 associated with the downhole tool 111 shown in FIG. 1. As illustrated in FIG. 5, a nozzle body 173 may be configured analogous to the threaded fastener 127 described above with reference to FIG. 2. However, in the present embodiment, the nozzle body 173 itself may serve as the threaded fastener 127. The nozzle body 173 may comprise a threaded portion 179. In some embodiments, the threaded portion 179 may be located near an exit end surface of the nozzle body 173. In other embodiments, the threaded portion 179 may be located near an internal end of the nozzle body 173. It is to be appreciated that any configuration known in the art may be used to secure the nozzle assembly 171 to the receiving surface 136.

As in previous embodiments, the nozzle body 173 may comprise a flange 175 extending laterally from the nozzle body 173. The flange 175 of the nozzle body 173 may comprise a plurality of holes 181. While only two holes 181 are depicted in FIG. 5, it is contemplated that additional holes 181 may be provided, which may be mutually spaced and located circumferentially within an outer periphery of the flange 175. In some embodiments, the holes 181 may be parallel to a longitudinal axis of the nozzle body 173. It is to be appreciated that other configurations are contemplated for the amount and placement of the holes 181.

In addition, the nozzle assembly 171 may comprise at least one dowel member 184 and at least one spring 185, collectively referred to herein as "at least one locking mechanism 183." As illustrated in FIG. 5, the at least one locking mechanism 183 may be located in a cavity (not shown) and may be in direct vertical alignment with the holes 181 of the flange 175. By way of example and not limitation, the dowel member 184 may include a dowel, pin, peg, or any suitable cylindrical rod, or in the alternative, the dowel member 184 may include a planar tab, slot, etc., as described in more detail above with reference to FIG. 2. In some embodiments, the at least one locking mechanism 183 may be biased, and the spring 185 may include, by way of non-limiting example, a compression spring or elastomeric member. In addition, the spring 185 may be separate from the dowel member 184, or alternatively, the spring 185 may be internal, integral, or otherwise included within, or permanently attached to, the dowel member 184. Furthermore, the at least one locking mechanism 183 may be positioned and configured to retain the nozzle body 173 into locked position relative to the receiving surface 136. In some embodiments, the dowel member 184 may be held in a fixed position with pressure from the spring 143 against a stop feature 157 (not shown) as described above with reference to FIGS. 3B and 3C. While a single locking mechanism 183 is depicted in FIG. 5, it is also contemplated in alternative embodiments that a plurality of locking mechanisms 183 (including a plurality of dowel members 184 and a plurality of springs 185) may be provided. Finally, the depressor ring 147 (FIG. 2) may temporarily be utilized in the present embodiment of FIG. 5 during tightening and removal of the nozzle body 173.

As in the previous embodiments discussed above, various apertures, cavities, or boreholes may be located in the receiving surface 136 in order to secure the nozzle body 173 to the receiving surface 136. In some embodiments, the receiving surface 136 may comprise a borehole containing, for example, complementary threads to receive the threaded portion 179 of the nozzle body 173. By way of example and not limitation, a borehole may be a standard bore or a blind bore, while in other embodiments, the bore may be a through bore. However, other configurations of apertures, cavities, or boreholes of the receiving surface 136 are also contemplated. In some embodiments, the receiving surface 136 may include a counterbore configured to position the top of the nozzle assembly 171 flush with, or recessed from, an exposed outer surface of the receiving surface 136. In the present embodiment, the nozzle assembly 171 may further include a fluid passageway 174 in an inner core of the nozzle body 173. An annular nozzle wall 177 may surround the fluid passageway 174 of the nozzle body 173. In some embodiments, the annular nozzle wall 177 may comprise a tungsten carbide material, for example, or any other suitable material configured to direct drilling fluids (e.g., drilling mud) within the fluid passageway 174 of the nozzle body 173.

In the illustrated embodiment of FIG. 5, the nozzle assembly 171 may be inserted (e.g., threaded) directly into a cavity of a drill bit, for example, the bit body 119 shown in FIG. 1. In other embodiments (not shown), the nozzle assembly 171 may be contained within a sleeve, which, in turn, may be inserted into an aperture of the receiving surface 136. In yet other embodiments (not shown), the nozzle body 173 may not serve as the threaded fastener 127 itself, but may, for example, be a standard nozzle insert 133 as shown in FIG. 1. In such alternative embodiments, any nozzle body, as known in the art, may be secured to a bit body using a separate fastening assembly 137, as shown and described above with reference to FIG. 2. By way of example and not limitation, a standard nozzle body, as known in the art, may be secured to the receiving surface 136 by at least one threaded fastener 127 (FIG. 2) located, for example, at an exit end, internal end, lateral side, etc., of the standard nozzle body (alternatively, or in addition to the foregoing embodiments). In yet other embodiments (not shown), the nozzle assembly 171 may include a threaded nut comprising, for example, the flange 175, the plurality of holes 181, and the locking mechanism 183, while the nozzle body 173 may be any standard nozzle body. It is to be appreciated that while the foregoing embodiments disclose specific configurations to secure the nozzle assembly 171 to the receiving surface 136, additional embodiments may also be contemplated by augmenting any existing configuration of a nozzle body utilizing the locking capabilities of the present disclosure.

Figure 6A:
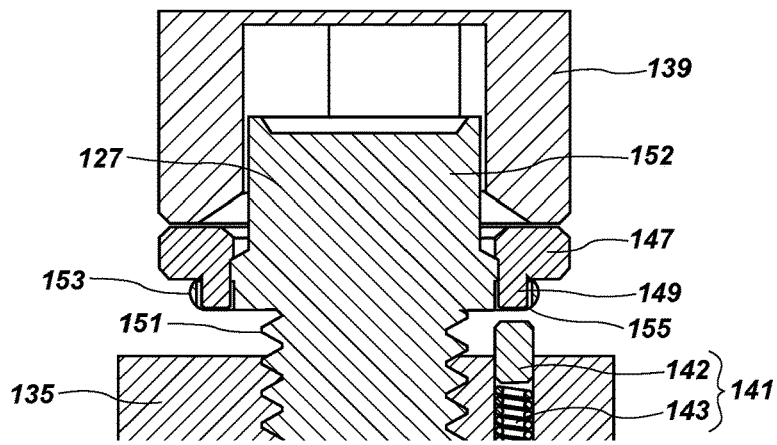
FIG. 6A is a side, cross-sectional view of a fastening assembly partially attached to a body of a downhole tool, with a depression ring in place, according to an embodiment of the present disclosure.
Figure 6B:
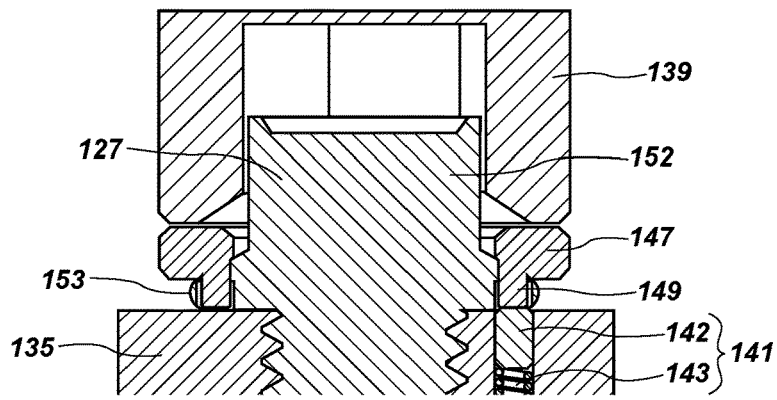
FIG. 6B is a side, cross-sectional view of a fastening assembly fully attached to a body of a downhole tool, with a depression ring in place, according to an embodiment of the present disclosure.
Figure 6C:
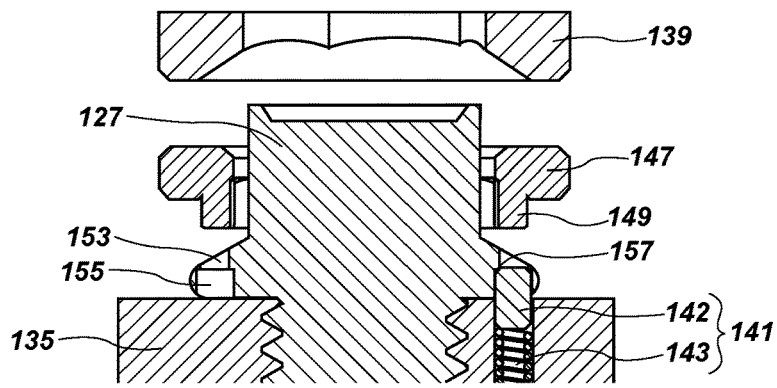
FIG. 6C is a side, cross-sectional view of a fastening assembly fully attached to a body of a downhole tool, with a depression ring partially removed and a locking mechanism inserted into a hole in a flange, according to an embodiment of the present disclosure.

Referring to FIGS. 6A through 6C, a method of fastening a component to a downhole tool body as shown in the embodiments described above is now discussed. In addition, the embodiment illustrated in FIGS. 6A through 6C is similar to the embodiment shown in FIG. 3B and retains the same reference numerals for similar features. It is also contemplated that alternative embodiments (e.g., FIG. 3C) discussed above would be similar in nature to the methods now described.

As shown in FIG. 6A, the method of fastening a component 135 to any downhole tool body may include inserting the at least one locking mechanism 141 into the cavity 145 (not visible) of the component 135. In some embodiments, inserting the locking mechanism 141 may include placing the spring 143 into the cavity of the component 135 together with, or prior to, inserting the dowel member 142. As discussed in more detail above, the locking mechanism 141 may be temporarily retained within the cavity of the component 135. By way of non-limiting example, the dowel member 142 and, or in the alternative, the spring 143 may be held in place by interference fit or by any other mechanism designed to temporarily retain the locking mechanism 141 within the component 135.

With continuing reference to FIG. 6A, the method may further include providing the threaded fastener 127 including the flange 153, wherein the flange 153 further comprises the plurality of holes 155, as described above. By installing the depressor ring 147 around the head portion 152 of the threaded fastener 127, the holes 155 of the flange 153 are temporarily blocked, thus preventing the locking mechanism 141 from prematurely entering the holes 155. In some embodiments, the depressor ring 147 may include the plurality of teeth 149 corresponding to the plurality of holes 155 of the flange 153. In other embodiments, the method further comprises aligning the plurality of teeth 149 of the depressor ring 147 with the plurality of holes 155 of the flange 153 as the depressor ring 147 is inserted, thus creating a flush surface with the bottom surface of the plurality of teeth 149 and the bottom surface of the flange 153.

Once the depressor ring 147 is in place, the method may include inserting the threaded fastener 127 into an aperture (not visible) of the component 135 and tightening the threaded fastener 127 with a tool 139, such as, for example, a standard socket and socket wrench. In some embodiments, the threaded fastener 127 may be tightened (i.e., torqued) until the threaded portion 151 of the threaded fastener 127 is fully engaged within the component 135. In other embodiments (not shown), the component 135 may include a generally smooth, non-threaded cylindrical surface, wherein the threaded portion 151 of the threaded fastener 127 passes through and out of the component 135 and may be inserted into a receiving surface 136 (FIG. 2).

FIG. 6B illustrates the threaded fastener 127 fully engaged into the component 135, with the tool 139 and the depressor ring 147 still in position around the head portion 152 of the threaded fastener 127. Thus, the method may include fully depressing the locking mechanism 141 into the cavity of the component 135 by pressure from flange 153 and the teeth 149 of the depressor ring 147. By way of non-limiting example, the bottom surfaces of the teeth 149 of the depressor ring 147 are generally flush with the bottom surface of the flange 153, which may be achieved by the cross-sectional diameter of the teeth 149 of the depressor ring 147 being less than the cross-sectional diameter of both the lower aperture 159 and the upper aperture 161 of the flange 153, as discussed above with reference to FIG. 3B.

As shown in FIG. 6C, the process may include removing the tool 139 and the depressor ring 147. In some embodiments, the method may include replacing the tool 139 without the depressor ring 147 and torqueing (e.g., slightly rotating) the threaded fastener 127 in order to align the locking mechanism 141 with a hole of the plurality of holes 155 of the flange 153, thus securing the threaded fastener 127 into locked position relative to the component 135. The locked position may be achieved by enabling a dowel member 142 of the locking mechanism 141 to be biased upward by the spring 143. In some embodiments, the method may further comprise retaining the dowel member 142 with a stop feature 157 located within the holes 155, as illustrated in FIG. 6C. In other embodiments, the stop feature 157 may be located, for example, within the cavity of the component 135 as described above in more detail with reference to FIG. 3C. It to be appreciated that additional embodiments for employing the stop feature 157 are also contemplated.

Furthermore, in some embodiments, the method may comprise attaching a formation-engaging assembly to an earth-boring tool (e.g., the leg 121 to the bit body 119 of FIG. 1). In other embodiments, the method may comprise attaching the nozzle assembly 171 to the receiving surface 136 as described above with reference to FIG. 5. While in yet other embodiments, the method may comprise attaching the cover 169 to the tubular body 167 as shown in FIG. 4.

Figure 7:
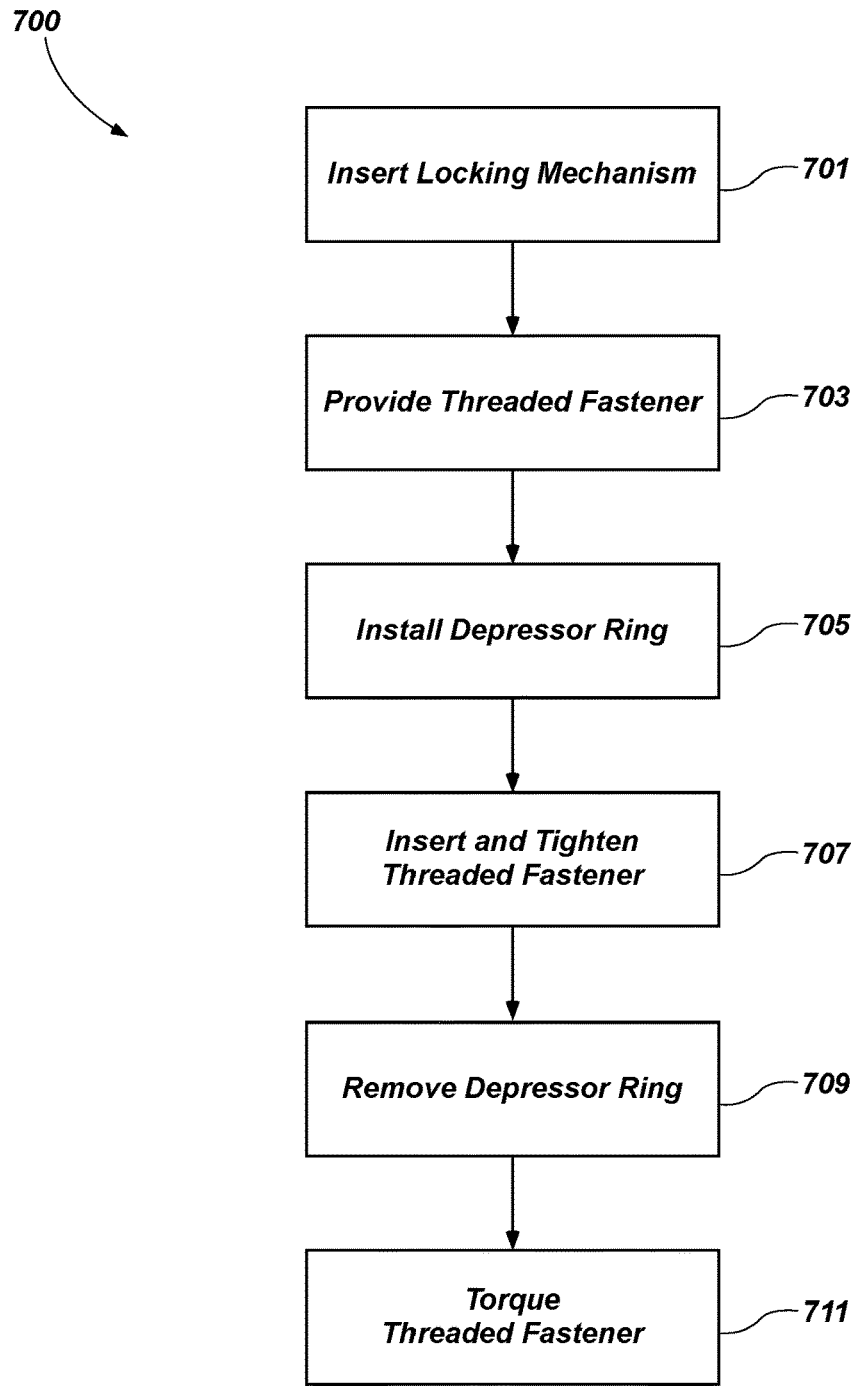
FIG. 7 is a simplified flowchart illustrating a method for fastening a component to a downhole tool body.

FIG. 7 is a simplified flowchart illustrating a method 700 for fastening a component to a downhole tool 111 of FIG. 1. Although the flowchart may describe operational acts as a sequential process, many of these acts can be performed in another sequence, in parallel, or concurrently. In addition, the order of the acts may be rearranged.

Referring to FIGS. 2 and 6A through 6C together, at operation 701, the method may include inserting the locking mechanism 141 into the cavity 145 of the component 135. At operation 703, the method may include providing the threaded fastener 127 comprising the flange 153, wherein the flange 153 further comprises the plurality of holes 155. At operation 705, the method may include installing the depressor ring 147 around the head portion 152 of the threaded fastener 127. At operation 707, the method may include inserting the threaded fastener 127 into the aperture 163 of the component 135 and tightening the threaded fastener 127 with a tool 139. A t operation 709, the method may include removing the depressor ring 147. At operation 711, the method may, optionally, further include torqueing the threaded fastener 127 to align the dowel member 142 with a hole of the plurality of holes 155 of the flange 153, if not already so aligned, in order to secure the threaded fastener 127 into locked position relative to the component 135.

It is to be appreciated that, while the foregoing embodiments disclose fastening assemblies for mutually securing components of downhole tools, the fastening assemblies may also be applicable in any other setting or industry that includes components mutually secured by fasteners that may loosen due to vibration.

Additional non-limiting example embodiments of the disclosure are set forth below.

Embodiment 1

A downhole tool, comprising: an assembly comprising at least two components; at least one fastening assembly securing one of the at least two components to another of the at least two components, the at least one fastening assembly comprising: a threaded fastener having a longitudinal portion within an aperture in the one of the at least two components and a threaded segment of the longitudinal portion engaged with a cooperatively threaded bore extending at least into the other component, the threaded fastener including a flange extending laterally from the longitudinal portion substantially abutting an adjacent surface of the one component, the flange comprising a plurality of mutually spaced holes located circumferentially within an outer periphery of the flange and extending parallel to the longitudinal portion; and at least one locking mechanism including a spring located in a cavity of the one of the at least two components proximate the aperture and a dowel member biased outwardly with a portion extending into one of the holes of the flange and a second portion within the cavity.

Embodiment 2

The downhole tool of Embodiment 1, wherein the one of the at least two components comprises a formation-engaging assembly and the other of the at least two components comprises an earth-boring tool body.

Embodiment 3

The downhole tool of Embodiment 1, wherein the one of the at least two components comprises a cover and the other of the at least two components comprises a tubular body having an aperture over which the cover is secured.

Embodiment 4

The downhole tool of Embodiment 1, wherein the assembly further comprises a nozzle assembly affixed to a bit body.

Embodiment 5

The downhole tool of Embodiment 1, further comprising a stop feature configured to retain at least a portion of the dowel member of the at least one locking mechanism within the cavity of the one of the at least two components.

Embodiment 6

The downhole tool of Embodiment 1, wherein the at least one locking mechanism comprises a plurality of locking mechanisms positioned in the plurality of holes of the flange.

Embodiment 7

The downhole tool of Embodiment 6, wherein a circumferential angle between the plurality of holes of the flange may be less than a circumferential angle between at least two locking mechanisms of the plurality of locking mechanisms.

Embodiment 8

The downhole tool of Embodiment 1, wherein the threaded fastener having a longitudinal portion further comprises a threaded portion on at least a part of the longitudinal portion and a head portion opposite the longitudinal portion, and wherein the flange is permanently affixed to the threaded fastener and is located between the longitudinal portion and the head portion.

Embodiment 9

The downhole tool of Embodiment 1, wherein the at least one locking mechanism including a spring and a dowel member includes at least one of the spring being separate from the dowel member or the spring being integral with the dowel member.

Embodiment 10

A fastening system for a downhole tool, comprising: at least one component configured to attach to a body of the downhole tool, the at least one component comprising at least one cavity and at least one adjacent aperture; at least one spring-loaded locking mechanism located in the at least one cavity; a threaded fastener located in the at least one aperture, the threaded fastener comprising a head portion, a threaded portion and a flange including a plurality of holes positioned in vertical alignment with the at least one cavity; and a removable depressor ring including a plurality of teeth positioned to insert into the plurality of holes of the flange, the removable depressor ring being configured to depress the at least one spring-loaded locking mechanism during tightening of the threaded fastener, a portion of the at least one spring-loaded locking mechanism configured to slide into a hole of the plurality of holes once the removable depressor ring has been removed and the flange of the threaded fastener is in locked position against an adjacent surface of the at least one component.

Embodiment 11

The fastening system of Embodiment 10, wherein the threaded fastener comprises a threaded bolt and wherein the flange of the threaded fastener is permanently affixed to the threaded fastener.

Embodiment 12

The fastening system of Embodiment 10, wherein the at least one spring-loaded locking mechanism further comprises a dowel member and a spring located in the at least one cavity.

Embodiment 13

The fastening system of Embodiment 10, wherein the at least one spring-loaded locking mechanism comprises a plurality of spring-loaded locking mechanisms positioned in the plurality of holes of the flange, and wherein a circumferential angle between the plurality of holes of the flange is different than a circumferential angle between at least two spring-loaded locking mechanisms of the plurality of spring-loaded locking mechanisms.

Embodiment 14

The fastening system of Embodiment 10, further comprising a stop feature located within the plurality of holes or located within the at least one cavity, the stop feature positioned and configured to retain the at least one spring-loaded locking mechanism within the at least one cavity of the at least one component when a portion thereof is received with a hole of the flange.

Embodiment 15

The fastening system of Embodiment 14, wherein each hole of the plurality of holes further comprises a stop feature including an upper aperture and a lower aperture, and wherein each of the cross-sectional diameter of the lower aperture and the cross-sectional diameter of the at least one spring-loaded locking mechanism is greater than a cross-sectional diameter of the upper aperture.

Embodiment 16

A method of fastening a component to a downhole tool body, the method comprising: inserting at least one locking mechanism into a cavity of the component against an outward biasing force; providing a threaded fastener including a flange, the flange comprising a plurality of holes; installing a depressor ring onto the threaded fastener, the depressor ring including a plurality of teeth corresponding to and received within the plurality of holes of the flange; inserting the threaded fastener into an aperture of the component adjacent the cavity and tightening the threaded fastener with a tool abutting the depressor ring to cause the flange and teeth to depress the at least one locking mechanism into the cavity; and removing the depressor ring to permit a portion of the at least one locking mechanism to enter a hole of the flange under the biasing force.

Embodiment 17

The method of Embodiment 16, further comprising torqueing the threaded fastener into a position to permit a portion of the at least one locking mechanism to enter a hole.

Embodiment 18

The method of Embodiment 16, wherein inserting the at least one locking mechanism into the cavity of the component against an outward biasing force further comprises inserting at least one dowel member and at least one spring into the cavity of the component.

Embodiment 19

The method of Embodiment 16, further comprising retaining the at least one locking mechanism with a stop feature located within each hole of the plurality of holes of the flange or within the cavity of the component.

Embodiment 20

The method of Embodiment 16, wherein inserting the threaded fastener into an aperture of the component and tightening the threaded fastener with a tool further comprises attaching at least one of a formation-engaging assembly to an earth-boring tool, a nozzle to a bit body, or a cover to a tubular body.

Although the foregoing description contains many specifics, these are not to be construed as limiting the scope of the present disclosure, but merely as providing certain exemplary embodiments. Similarly, other embodiments of the disclosure may be devised which do not depart from the spirit or scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the disclosed embodiments, which fall within the meaning and scope of the claims, are encompassed by the present disclosure.

What is claimed is:

1. A downhole tool, comprising:
an assembly comprising at least two components;
at least one fastening assembly securing one of the at least two components to another of the at least two components, the at least one fastening assembly comprising: a threaded fastener having a longitudinal portion within an aperture in the one of the at least two components and a threaded segment of the longitudinal portion engaged with a cooperatively threaded bore extending at least into the other component, the threaded fastener including a flange integrally formed with the threaded fastener, the flange extending laterally from the longitudinal portion substantially abutting an adjacent surface of the one component, the flange comprising a plurality of mutually spaced holes located circumferentially within an outer periphery of the flange and extending parallel to the longitudinal portion; and at least one locking mechanism including a spring located in a cavity of the one of the at least two components proximate the aperture and a dowel member biased outwardly with a portion extending into one of the holes of the flange and a second portion within the cavity.

2. The downhole tool of claim 1, wherein the one of the at least two components comprises a formation-engaging assembly and the other of the at least two components comprises an earth-boring tool body.

3. The downhole tool of claim 1, wherein the one of the at least two components comprises a cover and the other of the at least two components comprises a tubular body having an aperture over which the cover is secured.

4. The downhole tool of claim 1, wherein the assembly further comprises a nozzle assembly affixed to a bit body.

5. The downhole tool of claim 1, further comprising a stop feature configured to retain at least a portion of the dowel member of the at least one locking mechanism within the cavity of the one of the at least two components.

6. The downhole tool of claim 1, wherein the at least one locking mechanism comprises a plurality of locking mechanisms positioned in the plurality of holes of the flange.

7. The downhole tool of claim 6, wherein a circumferential angle between the plurality of holes of the flange is less than a circumferential angle between at least two locking mechanisms of the plurality of locking mechanisms.

8. The downhole tool of claim 1, wherein the threaded fastener having a longitudinal portion further comprises a threaded portion on at least a part of the longitudinal portion and a head portion opposite the longitudinal portion, and wherein the flange is located between the longitudinal portion and the head portion.

9. The downhole tool of claim 1, wherein the at least one locking mechanism including a spring and a dowel member includes at least one of the spring being separate from the dowel member or the spring being integral with the dowel member.

10. A fastening system for a downhole tool, comprising:
at least one component configured to attach to a body of the downhole tool, the at least one component comprising at least one cavity and at least one adjacent aperture;
at least one spring-loaded locking mechanism located in the at least one cavity;
a threaded fastener located in the at least one aperture, the threaded fastener comprising a head portion, a threaded portion and a flange including a plurality of holes positioned in vertical alignment with the at least one cavity; and
a removable depressor ring including a plurality of teeth positioned to insert into the plurality of holes of the flange, the removable depressor ring being configured to depress the at least one spring-loaded locking mechanism during tightening of the threaded fastener, a portion of the at least one spring-loaded locking mechanism configured to slide into a hole of the plurality of holes once the removable depressor ring has been removed and the flange of the threaded fastener is in locked position against an adjacent surface of the at least one component.

11. The fastening system of claim 10, wherein the threaded fastener comprises a threaded bolt and wherein the flange of the threaded fastener is permanently affixed to the threaded fastener.

12. The fastening system of claim 10, wherein the at least one spring-loaded locking mechanism further comprises a dowel member and a spring located in the at least one cavity.

13. The fastening system of claim 10, wherein the at least one spring-loaded locking mechanism comprises a plurality of spring-loaded locking mechanisms positioned in the plurality of holes of the flange, and wherein a circumferential angle between the plurality of holes of the flange is less than or greater than a circumferential angle between at least two spring-loaded locking mechanisms of the plurality of spring-loaded locking mechanisms.

14. The fastening system of claim 10, further comprising a stop feature located within the plurality of holes or located within the at least one cavity, the stop feature positioned and configured to retain the at least one spring-loaded locking mechanism within the at least one cavity of the at least one component when a portion thereof is received with a hole of the flange.

15. The fastening system of claim 14, wherein each hole of the plurality of holes further comprises a stop feature including an upper aperture and a lower aperture, and wherein each of the cross-sectional diameter of the lower aperture and the cross-sectional diameter of the at least one spring-loaded locking mechanism is greater than a cross-sectional diameter of the upper aperture.

16. A method of fastening a component to a downhole tool body, the method comprising:
inserting at least one locking mechanism into a cavity of the component against an outward biasing force;
providing a threaded fastener including a flange, the flange comprising a plurality of holes;
installing a depressor ring onto the threaded fastener, the depressor ring including a plurality of teeth corresponding to and received within the plurality of holes of the flange;
inserting the threaded fastener into an aperture of the component adjacent the cavity and tightening the threaded fastener with a tool abutting the depressor ring to cause the flange and teeth to depress the at least one locking mechanism into the cavity; and
removing the depressor ring to permit a portion of the at least one locking mechanism to enter a hole of the flange under the biasing force.

17. The method of claim 16, further comprising torqueing the threaded fastener into a position to permit a portion of the at least one locking mechanism to enter a hole.

18. The method of claim 16, wherein inserting the at least one locking mechanism into the cavity of the component against an outward biasing force further comprises inserting at least one dowel member and at least one spring into the cavity of the component.

19. The method of claim 16, further comprising retaining the at least one locking mechanism with a stop feature located within each hole of the plurality of holes of the flange or within the cavity of the component.

20. The method of claim 16, wherein inserting the threaded fastener into an aperture of the component and tightening the threaded fastener with a tool further comprises attaching at least one of a formation-engaging assembly to an earth-boring tool, a nozzle to a bit body, or a cover to a tubular body.

* * * * *

UNITED STATES PATENT AND TRADEMARK OFFICE
CERTIFICATE OF CORRECTION

PATENT NO. : 10,156,099 B2
APPLICATION NO. : 14/994793
DATED : December 18, 2018
INVENTOR(S) : Do Van Do Page 1 of 1

It is certified that error appears in the above-identified patent and that said Letters Patent is hereby corrected as shown below:

In the Specification

Column 13,   Line 7,   change "A t operation 709," to --At operation 709,--

Signed and Sealed this
Fifth Day of February, 2019

Andrei Iancu
*Director of the United States Patent and Trademark Office*